May 16, 1933.  W. T. YOUNG  1,909,387
BRAKE LOCK
Original Filed March 10, 1931  2 Sheets-Sheet 1

INVENTOR.
WILSON T. YOUNG
BY
*A.D.Caesar*
ATTORNEY.

May 16, 1933.  W. T. YOUNG  1,909,387
BRAKE LOCK
Original Filed March 10, 1931   2 Sheets-Sheet 2

INVENTOR.
WILSON T. YOUNG
BY
ATTORNEY.

Patented May 16, 1933

1,909,387

UNITED STATES PATENT OFFICE

WILSON T. YOUNG, OF OAKMONT, PENNSYLVANIA, ASSIGNOR, BY MESNE ASSIGNMENTS, TO SAFETY NUT CORPORATION, OF PHILADELPHIA, PENNSYLVANIA, A CORPORATION OF PENNSYLVANIA

BRAKE LOCK

Application filed March 10, 1931, Serial No. 521,430. Renewed October 8, 1932.

This invention relates to improvements in brake locks for use in combination with bolts and nuts and has for its object the provision of a new and improved brake-lock.

More particularly stated, one of the objects of this invention is to produce a brake lock which, in its active position, will exert a gripping pressure upon the threads of the bolt on which it is mounted due to forces which are present in the brake lock per se.

Another object of this invention is to produce a brake lock which, in its incipient position, (that is the position when it is first placed upon the bolt), may be mounted on the said bolt for threadable engagement therewith without any resultant gripping pressure on the said bolt, and which in its active bolt position (that is the position when it is advanced upon the said bolt a distance equal, at most, to the pitch of the bolt thread) will exert a gripping pressure upon the said bolt due to forces present in the brake lock per se.

Another object of this invention is to provide a coil-lock adapted to assume an expanded and contracted position with means which will normally keep the same in its expanded position.

The above objects are attained by forming a brake lock the free ends of which are designed to assume two different extreme positions, in one of which the said brake lock is not subjected to any lateral tension and in the other of which the brake lock is placed under lateral tension, and in providing means for normally keeping the brake lock in the position where it is under tension.

The above as well as other objects and advantages arising therefrom, and the structure of the device which will function so as to carry out the above objects will be made clear by the following description and the drawings which form a part thereof.

In the drawings Figure 1 is a perspective view of my new brake lock wherein the full lines show the brake lock in its expanded position and the dot and dash lines show the brake lock in its contracted position.

Figure 1:
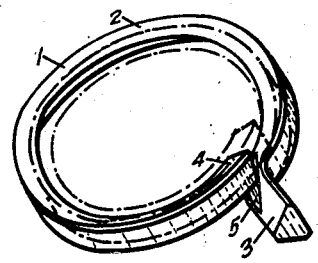
Figure 2:
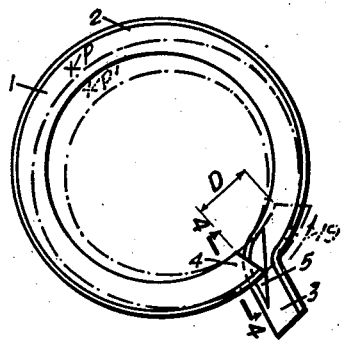
Figure 2 is a top view of the brake-lock shown in Figure 1 wherein the full lines show the brake-lock in its expanded position and the dot and dash lines show the brake-lock in its contracted position.
Figure 3:
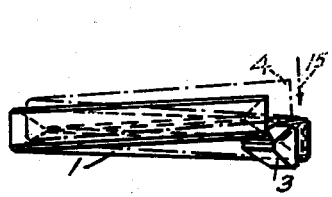
Figure 3 is a front view of the disclosure of Figure 2 wherein the full lines show the brake-lock in its expanded position and the dot and dash lines show the brake-lock in its contracted position.
Figure 4:
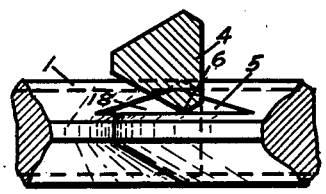
Figure 4 is a section taken along the line 4—4 of Figure 2.

Referring more particulralry to the drawings wherein similar reference numerals denote similar parts, reference numeral 1 denotes the brake-lock as a unit. The brake-lock 1 is constructed of resilient material and is composed of a body member 2 which terminates in a locking lug 3 and a bearing end 4. A shelf 5 is formed in the body member 2 near the locking lug 3 (see Figures 1, 2, 3, 4, 5 and 6), the shelf 5 serving to support the bearing end 4 of the body member 2 in its expanded position. It is to be noted that the brake lock 1 is constructed so as to occupy two positions which are here designated as the expanded and contracted positions. The expanded position is shown by the full lines in Figures 1, 2 and 3, while the contracted position is shown by the dot and dash lines in the said figures. In the expanded position the inner periphery of the body member 2 of the brake lock 1 bounds and forms a circle, the diameter of which is equal to the small diameter of the threads of the bolt with which the brake lock is to be associated. In the contracted position, the bearing end 4 and the locking lug 3 have moved relatively to each other around the point P as a pivot with the result that the inner periphery of the body member 2 of the brake lock 1 bounds and forms a figure which is not a circle, the perimeter and area of which are both less than the perimeter and area formed by the circle of the inner periphery of the brake lock 1 when it is in its expanded position. In the expanded position the brake lock 1 is helical in shape, as is clearly seen in an examination of Figures 1 and 3. This helix becomes of greater pitch when the brake lock is in its contracted position, as is clearly shown by the dot and dash lines in Figures 1 and 3. The body member 2 of the brake lock 1 is so formed that it normally tends to assume the helix shown by the full lines in Figures 1 and 3 (that is, the helix of the expanded position) with the result that when the brake lock is in the contracted position the end 4 of the brake lock 1 exerts a pressure vertically against the top surface of the body member 2, as shown by the arrow 15 in Figure 3.

As a direct result of the relative motion of the elements 4 and 5 when the brake-lock 1 has advanced to the contracted position, the free end 4 of the body member 2 has advanced a distance D beyond the point which it occupied when in the expanded position. When the end 4 of the brake-lock 1 is moved from the contracted position to the expanded position, the said length D is taken up and results in the increase of the perimeter of the figure formed by the inner periphery of the body member 2. This results in the body member 2 of the brake lock 1 being placed under tension.

For the purpose of explaining the movement of the body member 2 of the brake lock 1 from its contracted position to the expanded position, we can assume that it is a band of negligible thickness situated at a locus midway between the outer and inner peripheries of the said body member 2. This imaginary band would pass substantially through the point P' in the contracted position and through the point P in the expanded position. In moving from the contracted position to the expanded position the body member is flexed around the point P' and when the end 4 is placed upon the shelf 5 the point P' assumes the position at the point P. The body member is now in the form of a perfect circle, shown by the full lines in Figure 2. It is, however, under tension. The amount of tension in the body member 2 is directly proportional to the resiliency of the material used and the change D between the perimeter of the figures formed by the internal peripheries of the body member 2 in its expanded and contracted positions respectively.

The body member 2 is kept from returning to its contracted position by the wall 18 of the shelf 5 and the fact that the body member 2 was so formed that the helix in the expanded position is the normal helix. In going from the expanded position to the contracted position, these steps are reversed, the point P finally assuming the point P'. It is to be noted that the change in the perimeters of the body member 2 in going from the contracted position to the expanded position is greatest at the point P' approximately midway between the free ends of the said body member and least at the free ends which in this case are the bearing end 4 and the lug 3. The curve formed by the internal periphery of the body member in its contracted position is therefore an increasing spiral having its smallest diameter at the point P' and its greatest diameter at the point finally assumed by the free ends 4 and 3 of the body member 2. The diameter at the said points 4 and 3 is exactly equal to the diameter of the circle formed by the body member when in its expanded position.

It is to be noted that the structure of the body member wherein the normal helix is that shown in the expanded position and the normal position of the free ends is that shown in the contracted position results in a helix which is under a tension in the expanded position tending to move the free end 4 of the body member 2 in the direction of the arrow 19 to its contracted position and which when in a contracted position is under a tension tending to force the free end 4 in the direction of the arrow 15 to assume the helix shown in the expanded position.

It is to be noted that the width of the brake lock is less than that of the pitch of the threads formed on the bolt with which it is to cooperate.

The structure of the brake lock above described wherein it is under tension tending to return the free ends to the contracted position results in the elimination of the necessity for anchoring an end of the brake lock to either the nut or bolt. The force present in the brake lock due to the fact that it is under tension causes the free end 4 of the brake lock to grip the thread of a bolt. This has the same effect as and obviates the necessity of anchoring the free end 4 of the body member 2.

The shelf disclosed by me serves to keep the brake lock in its expanded position. By keeping the body member in its expanded position it is put under tension. By constructing the body member so that in the expanded position it forms a circle the diameter of which is equal to that of the small diameter of the threads formed on the bolt with which it is intended to cooperate I produce a brake lock which can be easily threaded on a bolt. By forming the brake lock so that its normal helix is that assumed by the brake lock in its expanded position a brake lock is produced which will keep its expanded position and exert an additional gripping force when in the operative position. The fact that the brake lock will keep its expanded position results in a brake lock which can be placed in its expanded position in the factory and shipped ready for use in that position.

Figure 7:
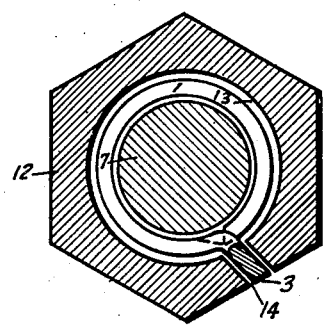
Figure 7 is a section taken along the line 7—7 of Figure 6.
Figure 5:
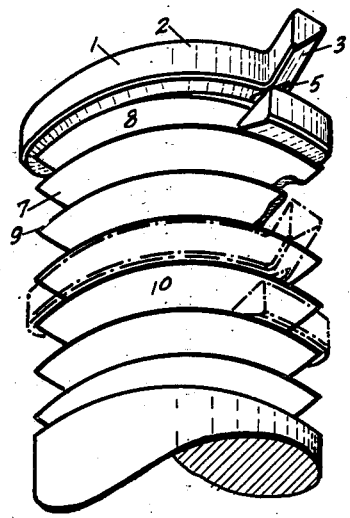
Figure 5 is a perspective view showing the brake-lock mounted upon the fragment of a bolt wherein the full lines show the incipient position of the brake-lock and the dot and dash lines show the brake-lock in an active position.
Figure 6:
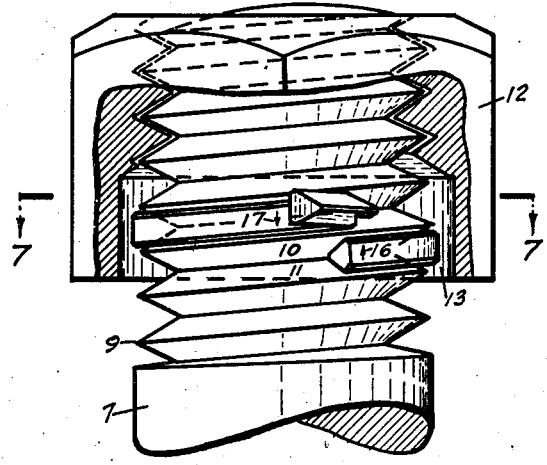
Figure 6 is a front view showing the assembly of a nut and a brake-lock mounted upon a fragment of a bolt. A portion of the nut is broken away for the purpose of more clearly illustrating the ensemble.

In Figures 5, 6 and 7 my improved brake lock is shown in different operative positions.

It is used as follows:—

The brake lock is generally received for use in its expanded position. It can be placed on the first thread 8 of the bolt 7 to assume the position shown by the full lines in Figure 5. (This position will herein be referred to as the initial position.) The nut 12 which has a circumferential groove 13 formed therein and a slot 14 leading from the face of the said nut to the said circumferential groove is now placed over the assembly of the bolt and locking lug so that the locking lug 3 is received within the slot 14. It is to be noted that the circumferential groove 13 is of a diameter greater than the external diameter of the brake lock (see Figures 6 and 7). It is to be noted that the outer surfaces of the brake lock do not touch the walls of the circumferential groove and that the locking lug 3 has sufficient clearance to be freely placed within and removed from the slot 14. The nut and brake lock can now be rotated downwardly to assume the position shown by the full lines in Figures 5 and 6. (This position will herein be referred to as the active position.)

It is to be noted that in the initial position the brake lock is in its expanded position and that the brake lock does not exert any pressure upon the faces or on the peripheries of the threads on which it is mounted. It is to be further noted that the brake lock is so formed that the width of the band is less than that of the pitch of the threads formed on the bolt with which it is to cooperate and that the pitch of the brake lock in its initial or expanded position is less than the pitch of the threads formed on the bolt with which it is to cooperate. Because of this structure the rotation of the brake lock from its initial position to its active position results in a cam action by the threads of the bolt 7 on the face of the brake lock and forces the end 4 of the brake lock out of its position in the shelf 5 (shown by the full lines in Figure 5) to assume a position wherein it conforms with the threads of the bolt (such as shown by the dot and dash lines in Figure 5 and the full lines in Figure 6). In this position the brake lock presses upwardly against the face 10 and downwardly against the face 11 of the thread with which it contacts, as shown by the arrows 16 and 17 respectively. This pressure is due to the resiliency of the material of which the brake lock is constructed and to the fact that the brake lock has been so constructed that its normal position forms a helix (shown in Figure 3) which must be expanded to assume the helix of greater pitch (shown by the dot and dash lines in Figure 5 and by the full lines in Figure 6). It is to be further noted that in the active position the body member of the brake lock exerts a gripping force on the threads of the bolt with which it is associated. This is due to the fact that in its active position the free end 4 of the body member has been removed from the shelf and the body member therefor tends to assume its contracted position, shown by the dot and dash lines in Figures 1, 2 and 3. This force, however, is opposed by the presence of the thread surfaces. The body member 2 of the locking lug is therefore kept in the form of a perfect circle (as is clearly shown in Figures 6 and 7) but exerts a pressure around the faces of the threads formed on the bolt. It is this gripping pressure which obviates the necessity of anchoring the free end 4 of the brake lock.

Instead of placing the brake lock 1 directly upon the bolt 7, as shown in Figure 5, it may be placed within the circumferential groove 13 of the nut 12 in the position shown in Figure 7 and the nut and brake lock as a unit screwed upon the bolt 7. As the nut advances upon the bolt the brake lock will function in exactly the same manner as hereinabove outlined.

It has been found that a nut equipped with my brake lock can be advanced upon a bolt but cannot be rotated off the bolt. It has also been found that once my nut is in position vibration will not cause it to become loose or work off the bolt. On the contrary vibration merely serves to cause the nut to grip the element which it is retaining more tightly.

Figure 8:
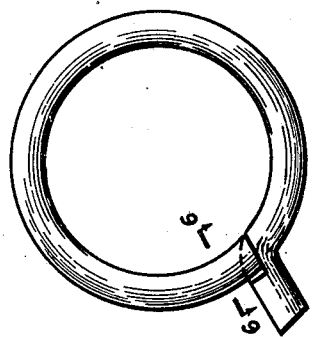
Figure 8 is a top view showing a modification.
Figure 9:
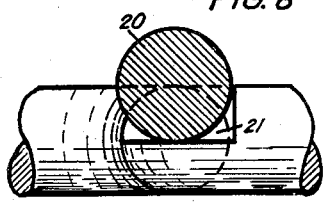
Figure 9 is an enlarged section of a fragment taken along the line 9—9 of Figure 8.

In Figures 8 and 9 I have shown a brake lock which is constructed on the same principle as that disclosed in Figures 1 to 7 inclusive but which differs therefrom in the shape of the shelf and in the fact that it is of circular instead of triangular cross-section. Definition:—The term "body member" as used in the specification and drawings denotes broadly the entire brake-lock including the locking lug which forms one of the terminal ends thereof.

It is to be understood that the above disclosure is made for the purpose of illustration only and not limitation since many changes may be made in the structure of my device without departing from the spirit of my invention. These changes can cover not only a change of material such as from spring steel, of which the brake lock herein shown is made, to brass, bronze or whatever other material which has the qualities of strength and resiliency necessary, but also changes in the cross-section of the band, changes in the shape and location of the shelf, as well as many other changes of structure not herein set forth. Also the nut may be replaced by a stationary member and the bolt or screw rotated as, for instance, in a set screw structure: Or my brake lock may be used in any construction where two elements are threadably joined together by providing one of the members with the necessary counterbore and slot and using my brake lock in conjunction therewith. For this reason it is my desire that the claims which are herein set forth for the purpose of defining my invention be limited only by the prior art.

Having described my invention what I claim as new and useful is:—

1. As an article of manufacture a helical band for use in combination with a bolt and a nut for locking the said nut against movement off the bolt the said band consisting of a split annular body member adapted to occupy an expanded and contracted position, and means formed on the said body member for receiving one of the ends of the said body member for holding the said body member in the expanded position.

2. As an article of manufacture a helical band for use in combination with a bolt and a nut for locking the said nut against movement off the bolt, the said band consisting of a body member terminating at one end in a locking lug, the said body member being adapted to occupy an expanded and a contracted position, a shoulder formed in the said body member and positioned at a point for receiving the other end of the said body member and holding the said body member in its expanded position.

3. As an article of manufacture a band for use in combination with a nut and a bolt for locking the said nut from movement off the said bolt, the said band consisting of a split annular body member terminating at one end in a locking lug, the said body member being adapted to assume an expanded and a contracted position of differing pitch, the width of the said body member being less than the pitch of the threads formed on the said bolt, the inner periphery of the said body member in its expanded position forming a circle the diameter of which is equal to the small diameter of the threads formed on the said bolt, the inner periphery of the said body member in its contracted position forming a figure the diameter and area of which are both less than that of the said circle formed by the said body member in the expanded position and the pitch of the helix of the said band in its expanded position being less than the pitch of the helix formed by the said band in its contracted position, and a shelf formed on the said body member near the said locking lug for receiving the other end of the said locking lug and holding the said band in its expanded position.

4. The combination of a bolt and a nut having an annular groove formed therein and a slot extending from a face of the said nut into the said annular groove of a split helical locking band the said locking band consisting of a body member terminating at one of its ends in a locking lug, the said locking lug being of less width than the said slot and extending into the said slot for contacting relationship with the walls of the said slot, the said body member in its active position having an external diameter smaller than the diameter of the said annular groove the said body member being of less width than the pitch of the threads formed on the said bolt, the said body member being adapted to assume an expanded and contracted position differing in pitch, the inner periphery of the said body member in its expanded position forming a circle the diameter of which is equal to the small diameter of the threads formed on the said bolt, the inner periphery of the said body member in its contracted position forming a figure the perimeter and area of both of which are both less than that of the said circle formed by the said body member in the expanded position, the pitch of the said helix formed by the said body member in its expanded position being less than the pitch of the helix formed by the said body member in its contracted position, the pitch of the helix formed by the said body member in its active position upon the bolt being greater than the pitch of the helix formed by the said body member in its contracted position, and a shelf formed on the said body member near the said locking lug for receiving the other end of the said body member and holding the said body member in its expanded position for easy threading upon the said bolt.

In testimony whereof I hereby affix my signature.

WILSON T. YOUNG.